United States Patent Office 3,475,223
Patented Oct. 28, 1969

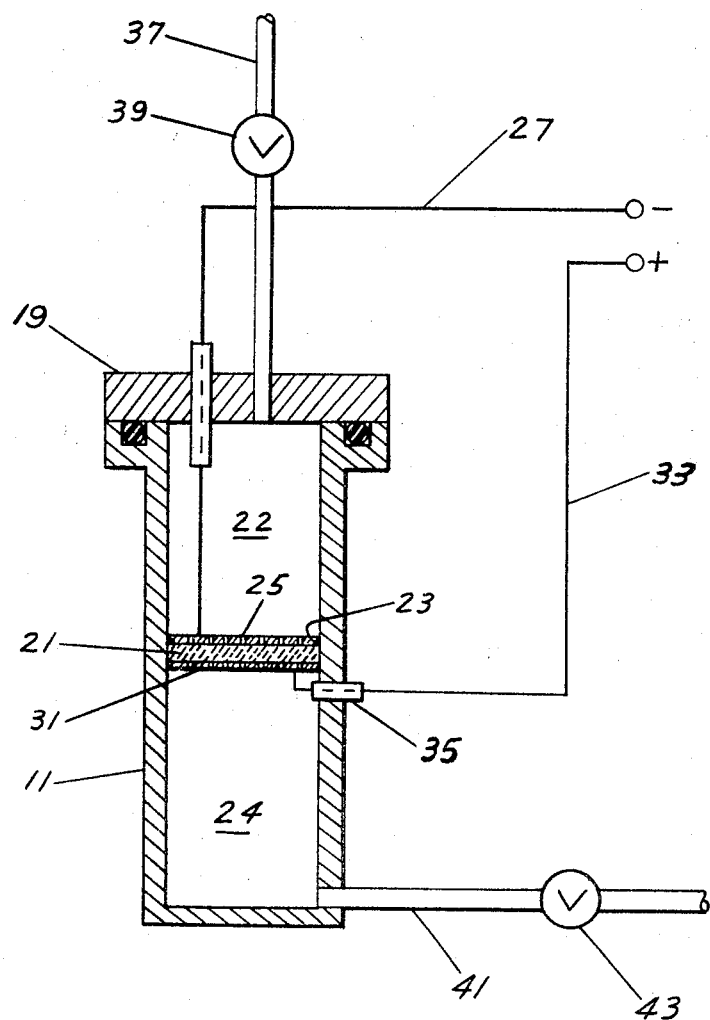

3,475,223
FUEL CELL
Joseph T. Kummer, Ann Arbor, and Neill Weber, Dearborn, Mich., assignors to Ford Motor Company, Dearborn, Mich., a corporation of Delaware
Continuation-in-part of application Ser. No. 458,596, May 25, 1965, which is a continuation-in-part of application Ser. No. 245,047, Dec. 17, 1962. This application May 2, 1966, Ser. No. 550,079
Int. Cl. H01m 27/30
U.S. Cl. 136—86   4 Claims

ABSTRACT OF THE DISCLOSURE

A fuel cell is provided using a mixture of ammonia gas and hydrogen gas as the anodic reactant and ammonium polysulfide as the cathodic reactant. The anodic reaction zone and the cathodic reaction zone are separated by a solid crystalline electrolyte consisting of a crystal lattice and ammonium ions which migrate in relation to said crystal lattice under influence of an electric field. The crystal lattice of the solid electrolyte consists of ions of oxygen and metal ions which are made up of about 92 to about 100 wt. percent and about 0 to about 8 wt. percent ions of a metal which have a valence in crystal lattice forming combination not greater than 2. The separator is impermeable to the anodic and cathodic reactants.

---

This application is a continuation-in-part of our copending application, Ser. No. 458,596, filed May 25, 1965, which in turn is a continuation-in-part of our application Ser. No. 245,047, filed Dec. 17, 1962, and now abandoned.

This invention relates to the production of electrical energy electrochemically and to energy conversion devices for the same. In particular, this invention relates to primary batteries of the type commonly referred to as fuel cells. In the cells of this invention, a first zone reactant is separated from a second zone reactant that is electrochemically reactive with a non-metallic ion of said first zone reactant. The reactant separator comprises a crystalline solid electrolyte which is impermeable to said first zone reactant and said second zone reactant and selectively ionically conductive with respect to non-metallic cations of said first zone reactant. The crystal lattice of this solid electrolyte comprises aluminum ions and oxygen ions in crystal lattice forming combination and nonmetallic cations of said first zone reactant which migrate in relation to said crystal lattice under influence of an electric field.

This invention is hereinafter illustrated with the ammonium ion constituting the aforementioned non-metallic cation of the first zone reactant and of the solid electrolyte employed.

Referring now to the accompanying schematic drawing, there is shown a stainless steel vessel 11. Tube 11 has a flange 13 at its open end. Flange 13 is provided with a groove or channel 15 in which rests a rubber O ring 17 which provides a vacuum-tight seal when the stainless steel cover plate 19 is secured to tube 11 by thread, bolt or other conventional attaching means, not shown. Near the middle of tube 11 is positioned a solid electrolyte in the form of circular plate 21. Glass seals 23 are provided to secure plate 21 to tube 11 in vacuum-tight seal to prevent passage of fluids between plate 21 and tube 11. Plate 21 divides the interior of tube 11 into a first (anodic) reaction zone 22 and a second (cathodic) reaction zone 24. The upper edge of plate 21 is provided with a thin, porous, conductor-catalyst 25, e.g. platinum. The platinum may be applied as platinum brite paint, e.g. platinum chloride in an organic reducing agent, electrodeposited upon a porous gold leaf, or a porous carbon plate may be impregnated with platinum and/or other catalyst by methods well known in the art. Through insulator 27 a suitably conductive wire anode 29 passes through tube 11 and is in electrical contact with conductor-catalyst 25. A porous conductor 31, which may be the same or different from catalyst-conductor 25 and which need not have catalytic potentialities, is shown at the lower edge of plate 21 to provide area coverage extension of cathode 33 which is in electrical contact with porous conductor 31 and exits from tube 11 via insulator 35. Conductor 31 may be dispensed with in those embodiments where the cathodic reactant in zone 24 includes a sufficient concentration of particulate conductive solids, e.g. carbon black, graphite powder, etc., to afford sufficient electron transfer between cathode 33 and electrolyte plate 21. Anode 29 and cathode 33 form parts of an external circuit, not further shown, which places such electrodes in electrical communication. Anode 29 and cathode 33, at least for many embodiments, are shown disproportionally thick in relation to other components of the cell to facilitate their location and identification.

The aforedescribed cell is operated with the anodic compartment 22 charged with ammonia gas, $NH_3$, and hydrogen gas, $H_2$, in a 1.5:1 to 4:1, preferably 2:1, molar ratio and the cathodic compartment 24 charged with liquid ammonium polysulfide. In another embodiment, the cathodic compartment 24 is charged with molten sulfur and carbon black to initiate the reaction.

In operation of this cell the ammonia molecule, $NH_3$, gives up an electron to anode 29, reacts with the hydrogen to form the ammonium ion, $NH_4^+$, which has a tendency to react with negative sulfur ions in the cathodic reaction zone 24. Ammonium ions from the solid electrolyte plate 21 are attracted to cathodic reactant first and in migrating from the solid electrolyte are replaced by ammonium ions from the anodic reaction zone 22. Sulfur in the cathodic reaction zone accept an electron from cathode 33 and become receptive to the ammonium ion.

The solid electrolyte, circular plate 21, may be prepared by the following methods:

Sodium beta-alumina, conventionally represented $Na_2O \cdot 11Al_2O_3$, is prepared by admixing $Na_2CO_3$ and $Al_2O_3$ in such proportions as to provide a mixture equivalent to 60 wt. percent $NaAlO_2$ and 40 wt. percent $Na_2O \cdot 11Al_2O_3$. This mixture is heated to about 2900° F. and forms a molten eutectic which when cooled to room temperature yields a product made up of particles of sodium beta-alumina imbedded in $NaAlO_2$.

The $NaAlO_2$ is dissolved in water leaving the powdered sodium beta-alumina which is then ground and/or milled to a powder the particles of which are less than about 1, preferably not significantly greater than about ⅓ micron, in maximum diameter. This powder is immersed overnight in liquid rubidium nitrate under an argon blanket and thence removed and washed in water. The resulting rubidium substituted beta-alumina powder is then pressed into blocks at a pressure of about 10,000 p.s.i. or higher, e.g. 10,000 to 110,000 p.s.i., and sintered in an enclosed platinum-rhodium crucible, in the presence of powdered rubidium substituted beta-alumina, at a temperature in the range of about 2900° F. to about 3300° F. for a time in the range of about 5 minutes to about 1 hour.

The resulting rubidium substituted beta-alumina plate is immersed overnight in liquid ammonium nitrate under an argon blanket. It is then removed, cleaned and the resulting ammonium substituted beta-alumina is ready for use in the cell.

The rubidium substituted beta-alumina also may be prepared directly used the aforementioned method of preparing sodium beta-alumina by substituting rubidium carbonate, $Rb_2CO_3$, for sodium carbonate, $Na_2CO_3$.

In another embodiment the solid electrolyte is prepared as in the preceding methods except that magnesium oxide prepared by calcining basic magnesium carbonate is mixed with $Al_2O_3$ and fired at about 1427° C. for about 30 minutes before the $Al_2O_3$ is mixed with the sodium carbonate or rubidium carbonate, depending upon whether the direct or substitutional preparation of rubidium beta-alumina of the preceding examples is used. The amount of MgO employed is an amount sufficient to provide an MgO concentration in the crystal lattice of above about 1.5 wt. percent and below about 4.5 wt. percent. Introduction of the migratory ion is the same as in the preceding methods.

The terms "crystal" and "crystalline" as employed herein exclude glass and are generic with respect to "single crystal," "monocrystal" and "polycrystalline."

The term "polycrystalline" as employed herein refers to a plurality of single crystals bound together by sintering or other suitable means to form a cationically conductive object.

It is to be understood that this invention is not limited to the examples herein shown and described. Changes and modifications may be made without departing from the spirit and scope of the invention as defined in the appended claims.

We claim:
1. In a method for producing electrical energy electrochemically which comprises separating an anodic reactant comprising a mixture of ammonia and hydrogen gas in a ratio of about 1.5:1 to about 4:1 from a cation accepting cathodic reactant comprising liquid ammonium polysulfide by an electrolyte and providing conduction means in electrical contact with and admitting of electron flow between said anodic reactant and said cathodic reactant in external relationship with respect to said electrolyte, the improvement in combination therewith consisting of a reactant separator that is positioned between and in contact with said anodic reactant and said cathodic reactant, said separator being impermeable to said anodic reactant and said cathodic reactant and ionically selectively permeable to ammonium ion, and comprising a crystalline solid electrolyte consisting of a crystal lattice and said ammonium ion which migrates in relation to said lattice under influence of an electric field, said crystal lattice consisting essentially of ions of oxygen and metal ions in crystal lattice forming combination, said metal ions consisting essentially of about 92 to about 100 wt. percent ions of aluminum and 0 to 8 wt. percent ions of metal which have a valence in crystal lattice forming combination not greater than 2.

2. The method of claim 1 wherein said crystal lattice consists of ions of oxygen and ions of aluminum.

3. The method of claim 1 wherein said ions of metal which have a valence in crystal lattice forming combination not greater than 2 are ions of magnesium.

4. A fuel cell for generating electrical energy electrochemically comprising in combination:
  (1) container means
    (a) substantially enclosing an anodic reaction zone,
    (b) substantially enclosing a cathodic reaction zone positioned to admit of cationic communication with said anodic reaction zone,
    (c) having inlet means through which ammonia and hydrogen gas can be introduced into said anodic reaction zone,
    (d) inlet means through which ammonium polysulfide can be introduced into said cathodic reaction zone, and
    (e) outlet means through which reaction products can be removed from said cathodic reaction zone,
  (2) a cathode in said cathodic reaction zone,
  (3) an anode in said anodic reaction zone and in electrical connection with said cathode in external relationship with respect to said anodic reaction zone and said cathodic reaction zone, and
  (4) a separator interposed between said anodic reaction zone and said cathodic reaction zone, said separator being further characterized in that
    (a) it is impermeable to ammonia, hydrogen, and ammonium polysulfide and ionically selectively permeable and conductive to ammonium ions, and
    (b) comprising a crystalline solid electrolyte consisting of a crystal lattice and ammonium ions which migrate in relation to said crystal lattice under influence of an electric field, said crystal lattice consisting essentially of ions of oxygen and ions of metal at least about 92 wt. percent of which are ions of aluminum and 0 to about 8 wt. percent of which are ions of metal which have a valence in said crystal lattice forming combination not greater than 2.

References Cited

UNITED STATES PATENTS

| 3,266,940 | 8/1966 | Caesar | 136—86 |
| 2,640,756 | 6/1953 | Wills | 23—111 |
| 3,121,028 | 2/1964 | Story | 136—137 |
| 3,121,031 | 2/1964 | Gruneberg et al. | 136—86 |

OTHER REFERENCES

Ind. Eng. Chem., November 1954, vol. 46, No. 11, page 2404.

WINSTON A. DOUGLAS, Primary Examiner

H. A. FEELEY, Assistant Examiner

U.S. Cl. X.R.

136—153